(12) United States Patent
Morita

(10) Patent No.: US 8,548,709 B2
(45) Date of Patent: Oct. 1, 2013

(54) DRIVE ASSISTING DEVICE

(75) Inventor: Mitsuhiko Morita, Suntou-gun (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 42 days.

(21) Appl. No.: 13/264,940

(22) PCT Filed: Apr. 27, 2009

(86) PCT No.: PCT/JP2009/058286
§ 371 (c)(1),
(2), (4) Date: Oct. 17, 2011

(87) PCT Pub. No.: WO2010/125634
PCT Pub. Date: Nov. 4, 2010

(65) Prior Publication Data
US 2012/0035825 A1 Feb. 9, 2012

(51) Int. Cl.
*B60W 30/14* (2006.01)
*B60T 7/22* (2006.01)
*G08B 23/00* (2006.01)
*B60W 30/16* (2012.01)

(52) U.S. Cl.
CPC ..................................... *B60T 7/22* (2013.01)
USPC .................. 701/70; 701/96; 701/97; 701/98; 701/301; 123/349

(58) Field of Classification Search
USPC ...................................................... 701/93–96
See application file for complete search history.

(56) References Cited

U.S. PATENT DOCUMENTS
7,639,148 B2 * 12/2009 Victor ........................... 340/576
8,068,968 B2 * 11/2011 Kondoh ........................ 701/96

FOREIGN PATENT DOCUMENTS
| JP | A-05-039011 | 2/1993 |
| JP | A-11-099923 | 4/1999 |
| JP | A-2003-191770 | 7/2003 |
| JP | A-2005-125852 | 5/2005 |
| JP | A-2006-151126 | 6/2006 |

OTHER PUBLICATIONS

Translation of the International Preliminary Report on Patentability mailed Nov. 17, 2011 issued in International Application No. PCT/JP2009/058286.
International Search Report in International Application No. PCT/JP2009/058286; dated May 26, 2009 (with English-language translation).

\* cited by examiner

*Primary Examiner* — Helal A Algahaim
*Assistant Examiner* — Edward Torchinsky
(74) *Attorney, Agent, or Firm* — Oliff & Berridge, PLC

(57) ABSTRACT

A radar sensor detects a traveling state of a host vehicle. An inter-vehicle control ECU gives the amount of operation for the predetermined amount of control of the host vehicle so that the traveling state of the host vehicle detected by the radar sensor becomes a predetermined state. The amount of operation given by the inter-vehicle control ECU is reduced as a kind of restriction when the amount of operation given by the inter-vehicle control ECU becomes equal to or larger than a predetermined value. As a result, it is possible to reduce the dependence of the driver on the device.

8 Claims, 5 Drawing Sheets

DRIVE ASSISTING DEVICE

TECHNICAL FIELD

The present invention relates to a drive assisting device and in particular, to a drive assisting device which gives the amount of operation according to the predetermined amount of control of a host vehicle so that the traveling state of the host vehicle becomes a predetermined state.

BACKGROUND ART

Conventionally, in order to support driving of a driver of a vehicle, a device which controls an operation of a host vehicle automatically has been proposed. For example, Patent Literature 1 discloses a drive assisting device in which an inter-vehicle distance controller calculates a vehicle speed command value V* on the basis of an inter-vehicle distance L detected by an inter-vehicle distance sensor and a host vehicle speed $V_S$ detected by a vehicle speed sensor, a vehicle speed controller calculates a drive shaft torque command value $T_W{}^*$ on the basis of the vehicle speed command value, and a drive shaft torque controller calculates a brake hydraulic pressure command value $P_B{}^*$ and a throttle opening command value $\theta^*$ on the basis of the drive shaft torque command value to thereby perform tracking control of a preceding vehicle and inter-vehicle distance control.

In the inter-vehicle distance controller, the inter-vehicle distance decontrol conditions are set so that inter-vehicle distance control is removed when the host vehicle speed $V_s$ is equal to or lower than a decontrol vehicle speed $V_R$ and a preceding vehicle speed $V_t$ is equal to or lower than the decontrol vehicle speed $V_R$ or a value lower than this or a relative vehicle speed $\Delta V$ is equal to or lower than "0", Accordingly, in the device disclosed in Patent Literature 1, the inter-vehicle distance decontrol timing is set so that the frequency of driving resumption operations performed inconveniently by a driver is decreased.

CITATION LIST

Patent Literature

Patent Literature 1: Japanese Unexamined Patent Application Publication No. 2003-191770

SUMMARY OF INVENTION

Technical Problem

In the technique described above, however, the drive assisting device does not remove the inter-vehicle distance control until the speed of a host vehicle becomes equal to or lower than a predetermined vehicle speed. Accordingly, the driver may depend on the drive assisting device which brakes automatically.

In the related art, a constant speed traveling device with an inter-vehicle distance control function that allows a brake to be used therewith (hereinafter, may be referred to as ACC (Adaptive Cruise Control)), which is the above-described drive assisting device, performs driving assistance for safe driving. Accordingly, it is not possible to handle the sudden slowdown of a preceding vehicle unless a driver performs a driving operation of intervening in the control of the vehicle by the drive assisting device. This is because the upper limit of the deceleration of the braking operation by the drive assisting device is specified so that the driver is not too confident of or does not depend on the automatic braking operation by the drive assisting device. However, the upper limit of the deceleration by the drive assisting device has tended to ease in recent years. Accordingly, a problem occurs in that a driver depends on the device as described above.

The present invention has been made in view of such a situation, and it is an object of the present invention to provide a drive assisting device capable of reducing the dependence of a driver on the device.

Solution to Problem

The present invention is a drive assisting device including: a detection unit that detects a traveling state of a host vehicle; a vehicle control unit that gives an amount of operation for a predetermined amount of control of the host vehicle so that the traveling state of the host vehicle detected by the detection unit becomes a predetermined state; and operation amount changing means for reducing the amount of operation given by the vehicle control unit when the amount of operation given by the vehicle control unit becomes equal to or larger than a predetermined value.

According to this configuration, the detection unit detects the traveling state of the host vehicle, the vehicle control unit gives the amount of operation for the predetermined amount of control of the host vehicle so that the traveling state of the host vehicle detected by the detection unit becomes a predetermined state, and the operation amount changing means reduces the amount of operation given by the vehicle control unit as a kind of restriction when the amount of operation given by the vehicle control unit becomes equal to or larger than a predetermined value. As a result, it is possible to reduce the dependence of the driver on the device.

In this case, preferably, the detection unit detects the relative relationship between the host vehicle and another vehicle, the vehicle control unit gives braking force to the host vehicle when a possibility of collision of the host vehicle and another vehicle detected by the detection unit is equal to or higher than a predetermined threshold value, and the operation amount changing means reduces the braking force applied to the host vehicle by the vehicle control unit when the possibility of collision of the host vehicle and another vehicle detected by the detection unit is lower than the threshold value.

According to this configuration, the detection unit detects the relative relationship between the host vehicle and another vehicle, the vehicle control unit gives braking force to the host vehicle when the possibility of collision of the host vehicle and another vehicle detected by the detection unit is equal to or higher than a predetermined threshold value, and the operation amount changing means reduces the braking force applied to the host vehicle by the vehicle control unit when the possibility of collision of the host vehicle and another vehicle detected by the detection unit is lower than the threshold value. Thus, since a large braking force is given to the host vehicle when the possibility of collision of the host vehicle and another vehicle is high and a small braking force is given to the host vehicle at a safe time when the possibility of collision of the host vehicle and another vehicle is low, it is possible to reduce the dependence of the driver on the device while ensuring safety.

In this case, preferably, the operation amount changing means reduces the braking force applied to the host vehicle by the vehicle control unit to 0 when the possibility of collision of the host vehicle and another vehicle detected by the detection unit becomes lower than the threshold value due to giving the braking force to the host vehicle by the vehicle control unit.

According to this configuration, the operation amount changing means reduces the braking force applied to the host vehicle by the vehicle control unit to 0 when the possibility of collision of the host vehicle and another vehicle detected by the detection unit becomes lower than the threshold value due to giving the braking force to the host vehicle by the vehicle control unit. Accordingly, since a large braking force is given to the host vehicle when the possibility of collision of the host vehicle and another vehicle is high and no braking force is given to the host vehicle at a safe time when the possibility of collision of the host vehicle and another vehicle is low, it is possible to reduce the dependence of the driver on the device while ensuring safety.

In addition, preferably, the detection unit detects an inter-vehicle distance between the host vehicle and another vehicle, and the vehicle control unit gives braking force to the host vehicle so that the inter-vehicle distance between the host vehicle and another vehicle detected by the detection unit becomes a predetermined value.

According to this configuration, the vehicle control unit gives braking force to the host vehicle so that the inter-vehicle distance between the host vehicle and another vehicle detected by the detection unit becomes a predetermined value. Accordingly, since the vehicle control unit can give braking force to the host vehicle according to the inter-vehicle distance, it is possible to further improve the safety.

In addition, it is preferable to further include restoration means for returning the amount of operation reduced by the operation amount changing means to a value before reduction by an operation of a driver of the host vehicle.

According to this configuration, the restoration means returns the amount of operation reduced by the operation amount changing means to the value before reduction by the operation of the driver of the host vehicle. Accordingly, since a troublesome operation for the driver is needed, it is possible to further reduce the dependence of the driver on the device.

In this case, preferably, the restoration means returns the amount of operation reduced by the operation amount changing means to a value before reduction at any one of the time that the power source of the host vehicle is in a stopped state, the time of operation of stopping a power source of the host vehicle and the time of an operation of starting the power source of the host vehicle.

According to this configuration, the restoration means returns the amount of operation reduced by the operation amount changing means to the value before reduction at any one of the time that the power source of the host vehicle is in a stopped state, the time of operation of stopping a power source of the host vehicle and the time of an operation of starting the power source of the host vehicle. Accordingly, in order to return the amount of operation to the value before reduction, a troublesome operation for a driver who stops or starts the power source of the host vehicle is necessary. As a result, it is possible to further reduce the dependence of the driver on the device.

In addition, preferably, the restoration means returns the amount of operation reduced by the operation amount changing means to a value before reduction when a driver of the host vehicle performs an operation of stopping a power source.

According to this configuration, the restoration means returns the amount of operation reduced by the operation amount changing means to the value before reduction when the driver of the host vehicle performs an operation of stopping the power source. Accordingly, in order to return the amount of operation to the value before reduction, a troublesome operation in which the driver stops the engine of the host vehicle temporarily is needed. As a result, it is possible to further reduce the dependence of the driver on the device. In addition, when the driver stops the power source of the host vehicle temporarily, resetting for returning the amount of operation to the value before reduction becomes possible.

In addition, preferably, the operation amount changing means prohibits the vehicle control unit from giving the amount of operation for the predetermined amount of control of the host vehicle after the amount of operation given by the vehicle control unit becomes equal to or larger than a predetermined value.

According to this configuration, since the operation amount changing means prohibits the vehicle control unit from giving the amount of operation for the predetermined amount of control of the host vehicle after the amount of operation given by the vehicle control unit becomes equal to or larger than a predetermined value, it is possible to reduce the dependence of the driver on the device effectively as restrictions effective for the driver.

Advantageous Effects of Invention

According to the drive assisting device of the present invention, it is possible to reduce the dependence of a driver on the device.

DESCRIPTION OF EMBODIMENTS

Hereinafter, a drive assisting device related to an embodiment of the present invention will be described with reference to the drawings.

In a first embodiment of the present invention, a drive assisting device of a vehicle related to the present invention is applied to an ACC (Adaptive Cruise Control) system. The ACC system is for assisting the driving operation of a driver by executing ACC control to make a host vehicle travel according to either the set vehicle speed or the set inter-vehicle distance (inter-vehicle time) between the host vehicle and a preceding vehicle.

Figure 1:
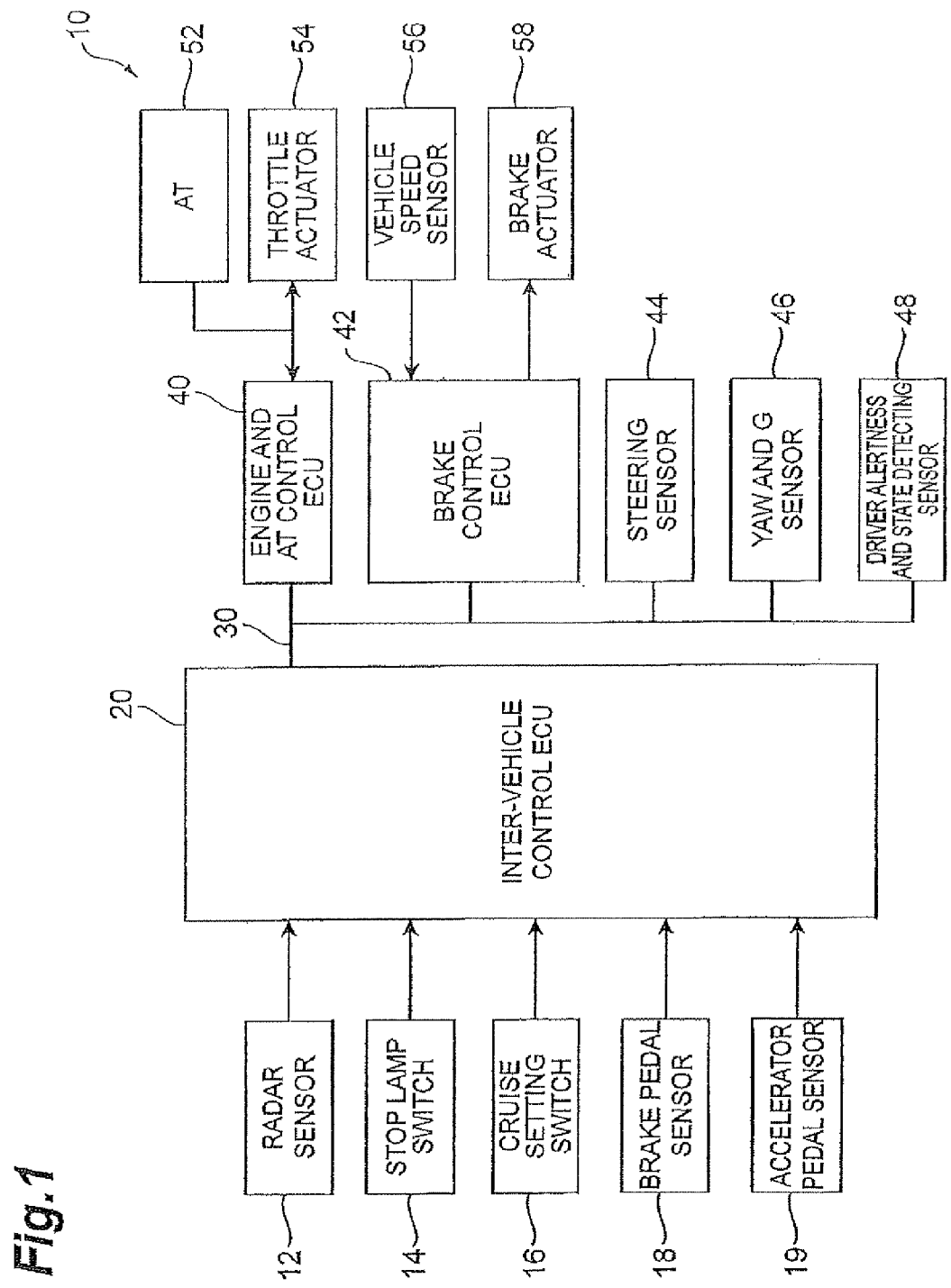
FIG. 1 is a block diagram showing the configuration of an ACC system related to a first embodiment.

As shown in FIG. 1, an ACC system 10 of the first embodiment includes an inter-vehicle control ECU (Electronic Control Unit) 20. A radar sensor 12, a stop lamp switch 14, a cruise setting switch 16, a brake pedal sensor 18, an accelerator pedal sensor 19, an engine and AT control ECU 40, a brake control ECU 42, a steering sensor 44, a yaw and G sensor 46, and a driver alertness and state detecting sensor 48 are connected to the inter-vehicle control ECU 20. The radar sensor 12, the stop lamp switch 14, the cruise setting switch 16, the brake pedal sensor 18, and the accelerator pedal sensor 19 are directly connected to the inter-vehicle control ECU 40. The engine and AT control ECU 40, the brake control ECU 42, the steering sensor 44, the yaw and G sensor 46, and the driver alertness and state detecting sensor 48 transmit and receive the information to and from the inter-vehicle control ECU 20 through a CAN (Control Area Network) 30.

The radar sensor 12 is means for detecting a preceding vehicle, and is used to acquire the speed (including the relative speed) and deceleration of a preceding vehicle in front of a host vehicle, an inter-vehicle distance between the host vehicle and the preceding vehicle, and an inter-vehicle time between the host vehicle and the preceding vehicle. The radar sensor 12 is a sensor which emits an electromagnetic wave, such as a millimeter wave, forward, receives a reflected wave which returns after being reflected by the object, and detects the vehicle speed and deceleration of a preceding vehicle, an inter-vehicle distance, and an inter-vehicle time. The radar sensor 12 transmits the detected vehicle speed and deceleration of the preceding vehicle, the detected inter-vehicle distance, and the detected inter-vehicle time to the inter-vehicle control ECU 20.

The stop lamp switch 14 is a switch for detecting whether or not a brake pedal has been pressed down. The stop lamp switch 14 transmits the ON/OFF information to the inter-vehicle control ECU 20.

The cruise setting switch 16 is an operating lever for giving an instruction to start the ACC system 10 and determining the set vehicle speed when the ACC system 10 is started.

The brake pedal sensor 18 is a sensor for detecting whether or not a brake pedal has been pressed down by the driver and for detecting the pressure amount of the brake pedal by the driver. The brake pedal sensor 18 transmits to the inter-vehicle control ECU 20 the ON/OFF information of the brake pedal and the information regarding the pressure amount of the brake.

The accelerator pedal sensor 19 is a sensor for detecting whether or not an accelerator pedal has been pressed down by the driver and for detecting the pressure amount of the accelerator pedal by the driver. The accelerator pedal sensor 18 transmits to the inter-vehicle control ECU 20 the ON/OFF information of the accelerator pedal and the information regarding the pressure amount of the accelerator.

An AT (automatic transmission) 52 and a throttle actuator 54 are connected to the engine and AT control ECU 40. The engine and AT control ECU 40 is a controller which controls an engine and an AT (Automatic Transmission). The engine and AT control ECU 40 sets a required target opening of a throttle valve and transmits the target opening to the throttle actuator 54.

The throttle actuator 54 is an actuator which adjusts the opening ratio of a throttle valve. The throttle actuator 54 operates according to a target throttle opening signal from the engine and AT control ECU 40 and adjusts the opening ratio of the throttle valve.

A vehicle speed sensor 56 and a brake actuator 58 are connected to the brake control ECU 42. The brake control ECU 42 sets the brake hydraulic pressure of a wheel cylinder of each wheel and transmits it to the brake actuator 58.

The brake actuator 58 is an actuator which controls the hydraulic pressure of a wheel cylinder. The brake actuator 58 operates an actuator according to the control signal from the brake control ECU 42 to generate predetermined hydraulic pressure in a wheel cylinder.

The steering sensor 44 is a sensor which detects a steering angle of a steering wheel. The yaw and G sensor 46 is a sensor which detects the yaw rate and lateral G acting on the vehicle. These sensors transmit the detected signals to the inter-vehicle control ECU 20.

The driver alertness and state detection sensor 48 is a sensor for detecting to what extent the driver is conscious of dangers of the driving environment of the host vehicle or for detecting the tension and wakefulness of the driver. Specifically, the driver alertness and state detecting sensor 48 is a sensor which detects the movement of the driver's eyeballs and the line-of-sight method by performing pattern recognition of an image of the driver's head captured by a camera or the like. Alternatively, the driver alertness and state detecting sensor 48 is a sensor which detects driver's pulse, blood pressure, body temperature, and the like.

The inter-vehicle control ECU (traveling control means, acceleration suppression control means, and deceleration control means) 20 performs inter-vehicle control in the ACC system on the basis of setting by the cruise setting switch 16. The inter-vehicle control ECU 20 determines the set vehicle speed of the ACC system 10 on the basis of the vehicle speed of a forward vehicle and the inter-vehicle distance and transmits, to the engine and AT control ECU 40 and the brake control ECU 42, driving and braking control signals according to the set vehicle speed and the inter-vehicle distance.

Figure 2:
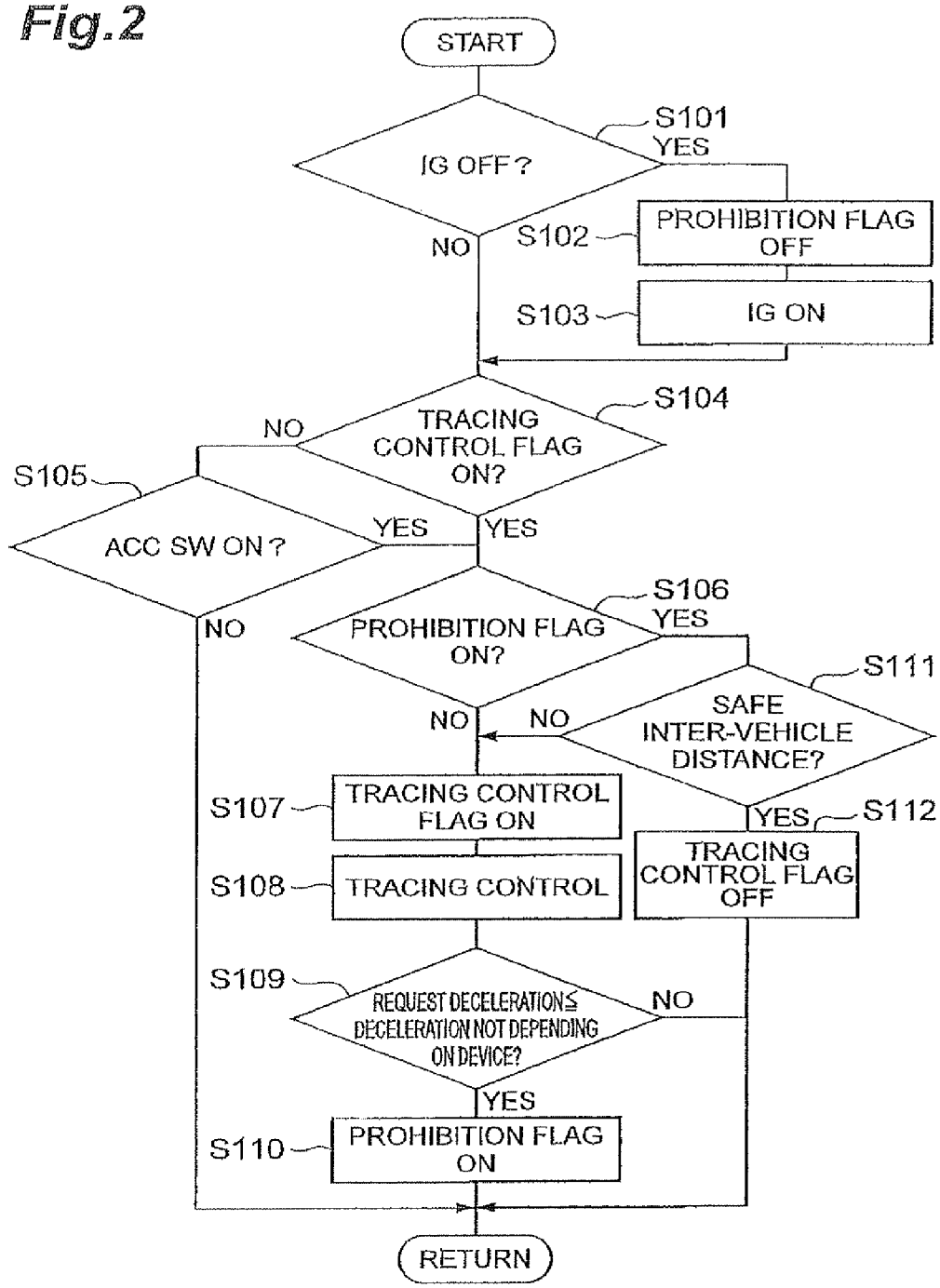
FIG. 2 is a flow chart showing an operation of the ACC system related to the first embodiment.

Hereinafter, an operation of the ACC system 10 of the present embodiment will be described. As shown in FIG. 2, when the ignition (IG) for starting the engine of the vehicle is OFF (S101), the inter-vehicle control ECU 20 sets a prohibition flag indicating that tracing control by the ACC is prohibited to OFF (S102). That is, as shown at t6 of FIG. 3, the prohibition flag is reset to OFF whenever the ignition is set to OFF by the driver. Then, as shown in FIG. 2, when the ignition is set to ON (S103), the inter-vehicle control ECU 20 executes the process from S104.

As shown in FIG. 2, when the ignition is ON (S101, S103) and a tracing control flag indicating that tracing control is being performed by the ACC is ON (S104), the inter-vehicle control ECU 20 executes the process from S106. In addition, as shown in FIGS. 2 and 3, even if the tracing control flag is OFF (S104), the inter-vehicle control ECU 20 executes the process from S106 when the falling of an ON signal of an ACC switch (SW) of the cruise setting switch is detected at time t1 (S105).

Figure 3:
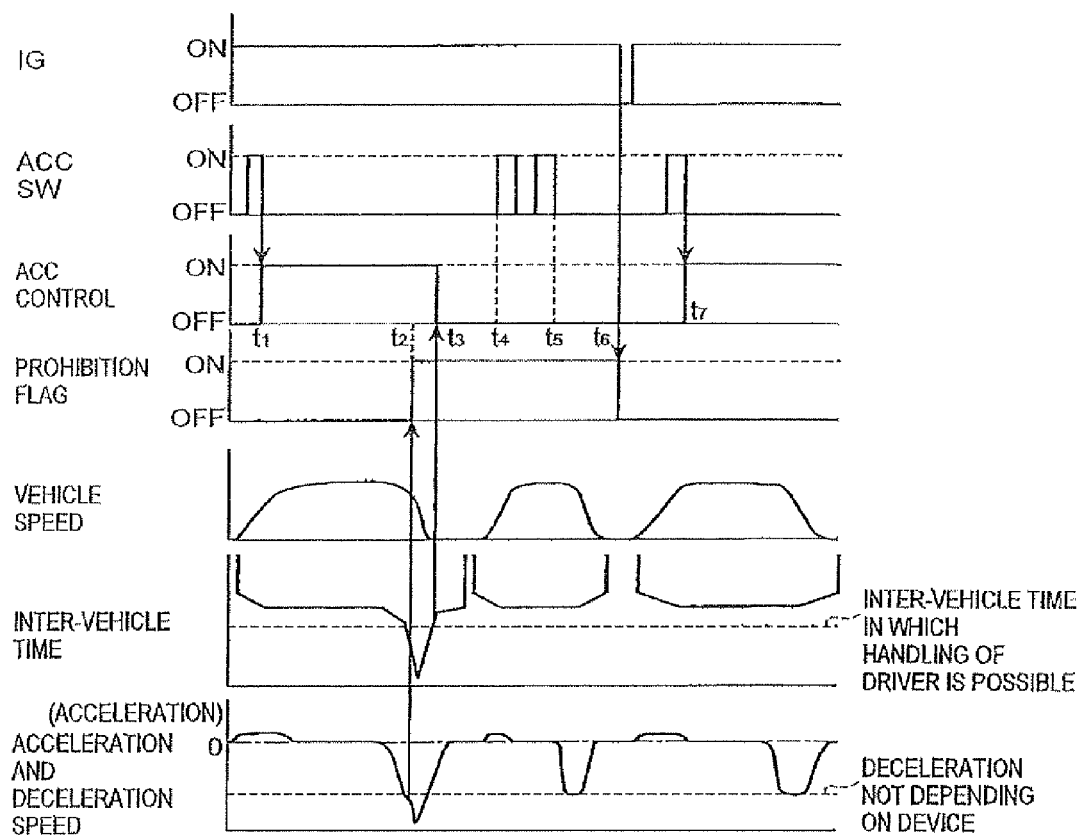
FIG. 3 is a timing chart showing the operation of the ACC system related to the first embodiment.

As shown in FIGS. 2 and 3, when the prohibition flag is not ON (S106), the inter-vehicle control ECU 20 sets the tracing control flag to ON (S107) and outputs control signals to the engine and AT control ECU 40 and the brake control ECU 42 to perform tracing control with the inter-vehicle distance, the inter-vehicle time, and the vehicle speed set by the cruise setting switch 16 (S108).

As shown in FIG. 2 and time t2 of FIG. 3, when the inter-vehicle distance becomes narrow due to the deceleration of a preceding vehicle and the like and requested deceleration (the deceleration direction is assumed to be a negative value), which is requested in order that the host vehicle and the preceding vehicle do not collide with each other, becomes equal to or lower than the deceleration at which the driver does not depend on the device (for example, −0.25 G to −0.5 G), the inter-vehicle control ECU 20 sets the prohibition flag to ON and outputs a control signal to the brake control ECU 42 to make the brake actuator 58 generate the braking force required for the deceleration (S110).

As shown in FIG. 2 and time t2 to t3 of FIG. 3, after the prohibition flag is set to ON (S106), the tracing control flag remains ON (S107) until the distance between the host vehicle and the preceding vehicle becomes a safe inter-vehicle distance (inter-vehicle time). However, as shown in FIG. 2 and time t3 of FIG. 3, when the distance between the host vehicle and the preceding vehicle becomes a safe inter-vehicle distance (inter-vehicle time), the inter-vehicle control ECU 20 sets the tracing control flag to OFF and the brake control ECU 42 sets the braking force generated by the brake actuator 58 to 0 (S112). In addition, the safe inter-vehicle distance or inter-vehicle time in this case may be set using the statistics of road traffic and the like.

As shown at time t4 to t5 of FIG. 3, after the prohibition flag is set to ON, ACC control is not performed continuously even if the driver turns ON the ACC switch several times. As shown at time t6 to t7 of FIG. 3, after the ignition becomes OFF and the prohibition flag becomes OFF accordingly, ACC control is performed again by driver's operation of turning ON the ACC switch.

In addition, as a trigger for resetting the prohibition flag in the ON state to OFF, the prohibition flag may be reset while the engine of the host vehicle is in a stopped state. Alternatively, when the ignition is set to ON again after being set to OFF, the prohibition flag in the ON state may be reset to OFF.

In addition, the trigger for resetting the prohibition flag in the ON state to OFF is not limited to ON and OFF of the engine described above. For example, the prohibition flag in the ON state may be reset to OFF by operating a switch provided outside a vehicle after the driver gets out of the vehicle. In addition, a switch which resets the prohibition flag in the ON state to OFF may be provided at a place that is difficult for the driver to touch directly from the driver's seat, such as deep under the steering wheel or under a passenger seat. In addition, although the switch which resets the prohibition flag in the ON state to OFF is provided at the place that is easy to touch for the driver directly, the operation of the switch may be set as a troublesome operation for a driver. For example, it is possible to force a driver to perform multiple operations or an operation of inputting a password or the like.

According to the present embodiment, the radar sensor 12 detects a traveling state of the host vehicle, and the inter-vehicle control ECU 20 gives the amount of operation for the predetermined amount of control of the host vehicle so that the traveling state of the host vehicle detected by the radar sensor 12 becomes a predetermined state, and the amount of operation given by the inter-vehicle control ECU 20 is reduced as a kind of restriction when the amount of operation given by the inter-vehicle control ECU 20 becomes equal to or larger than a predetermined value. As a result, it is possible to reduce the dependence of the driver on the device.

Moreover, according to the present embodiment, the radar sensor 12 detects an inter-vehicle distance, inter-vehicle time, and relative velocity between the host vehicle and another vehicle, and the inter-vehicle control ECU 20 controls the brake control ECU 42 to give braking force to the host vehicle when the possibility of collision of the host vehicle and another vehicle detected by the radar sensor 12 is high and reduces braking force applied to the host vehicle by the brake control ECU 42 when the possibility of collision of the host vehicle and another vehicle detected by the radar sensor 12 is low. Thus, since a large braking force is given to the host vehicle when the possibility of collision of the host vehicle and another vehicle is high and a small braking force is given to the host vehicle at a safe time when the possibility of collision of the host vehicle and another vehicle is low, it is possible to reduce the dependence of the driver on the device while ensuring safety.

In particular, according to the present embodiment, the inter-vehicle control ECU 20 reduces the braking force applied to the host vehicle by the brake control ECU 42 to 0 when the possibility of collision of the host vehicle and another vehicle detected by the radar sensor 12 becomes low due to giving the braking force to the host vehicle by the brake control ECU 42. Accordingly, since a large braking force is given to the host vehicle when the possibility of collision of the host vehicle and another vehicle is high and no braking force is given to the host vehicle at a safe time when the possibility of collision of the host vehicle and another vehicle is low, it is possible to reduce the dependence of the driver on the device while ensuring safety.

In addition, according to the present embodiment, the inter-vehicle control ECU 20 controls the brake control ECU 42 to give braking force to the host vehicle so that the inter-vehicle distance between the host vehicle and another vehicle detected by the radar sensor 12 becomes a predetermined value. Accordingly, since the brake control ECU 42 can give braking force to the host vehicle according to the inter-vehicle distance, it is possible to further improve the safety.

Moreover, according to the present embodiment, the inter-vehicle control ECU 20 returns the reduced amount of operation to the value before reduction by an operation of the driver of the host vehicle. Accordingly, since a troublesome operation for the driver is needed, it is possible to further reduce the dependence of the driver on the device.

In particular, according to the present embodiment, the inter-vehicle control ECU 20 returns the amount of operation reduced as a restriction to the value before reduction when the ignition of the host vehicle is set to OFF or when the ignition of the host vehicle is set to ON while the engine of the host vehicle is in a stopped state. Accordingly, in order to return the amount of operation to the value before reduction, a troublesome operation for a driver who stops or starts the engine of the host vehicle is necessary. As a result, it is possible to further reduce the dependence of the driver on the device.

In addition, the inter-vehicle control ECU 20 returns the reduced amount of operation to the value before reduction when the driver of the host vehicle performs an operation of turning OFF the ignition. Accordingly, in order to return the amount of operation to the value before reduction, a troublesome operation in which the driver stops the engine of the host vehicle temporarily is needed. As a result, it is possible to further reduce the dependence of the driver on the device. In addition, when the driver stops the engine of the host vehicle temporarily, resetting for returning the amount of operation to the value before reduction becomes possible.

In addition, since the inter-vehicle control ECU 20 prohibits the brake control ECU 42 from applying braking force after the braking force applied by the brake control ECU 42 becomes equal to or larger than a predetermined value, it is possible to reduce the dependence of the driver on the device effectively as restrictions effective for the driver.

Figure 4:
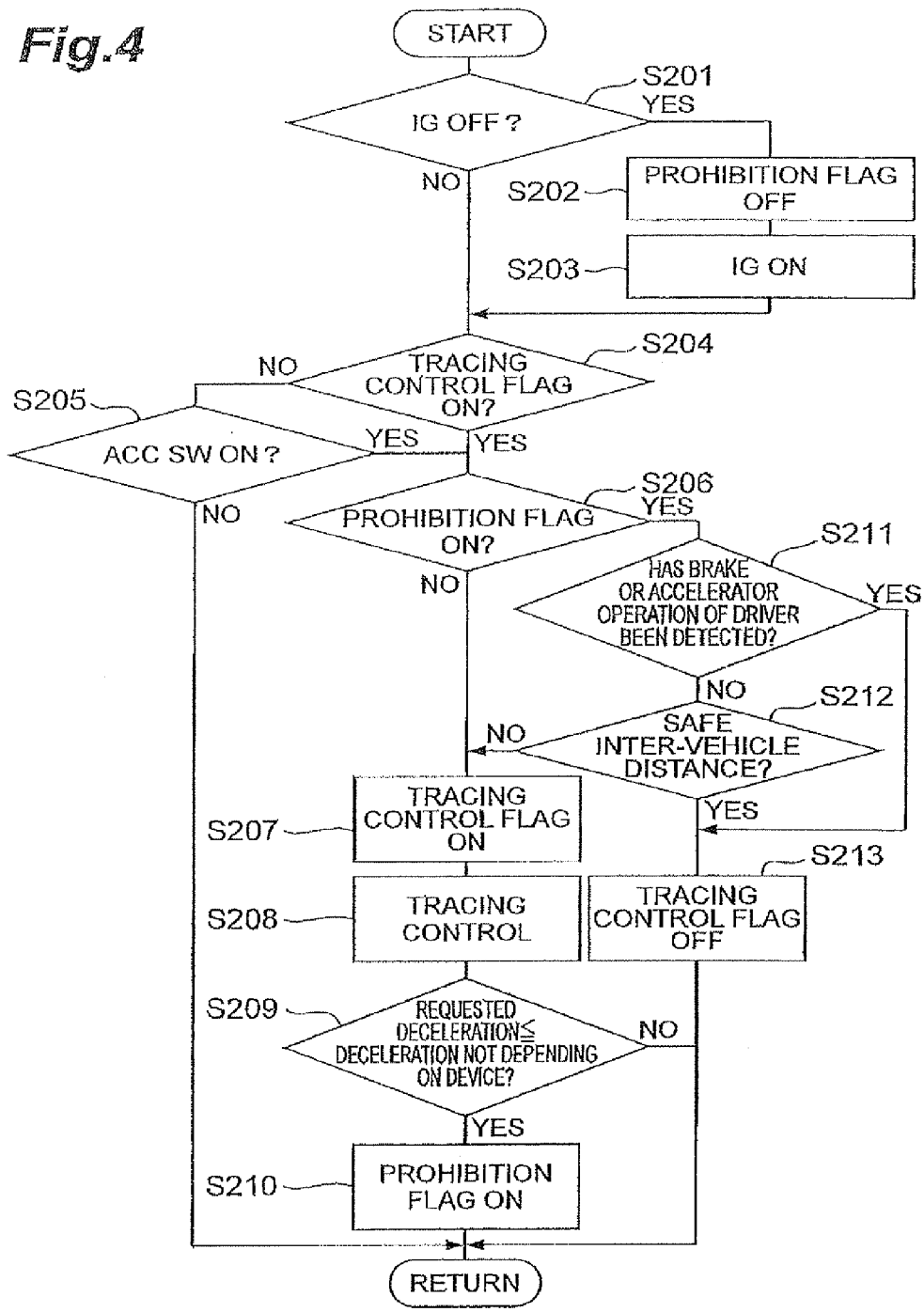
FIG. 4 is a flow chart showing an operation of an ACC system related to a second embodiment.

Hereinafter, a second embodiment of the present invention will be described. As shown in FIG. 4, the inter-vehicle control ECU 20 executes the same process S201 to S211 as the process S101 to S111 in the first embodiment described above.

In the present embodiment, in S211 where the prohibition flag is set to ON, when the brake pedal sensor 18 or the accelerator pedal sensor 19 detects that the driver has performed an operation of reducing the speed of the host vehicle (S212) even if the inter-vehicle distance between the host vehicle and a preceding vehicle is not a safe distance, the inter-vehicle control ECU 20 sets the tracing control flag to OFF.

In the present embodiment, since the driver is already calm enough to deal with the situation when the brake operation or the accelerator operation, of the driver is detected, the tracing control flag is set to OFF. Accordingly, ON and OFF of the tracing control flag can be controlled more appropriately according to the situation.

Figure 5:
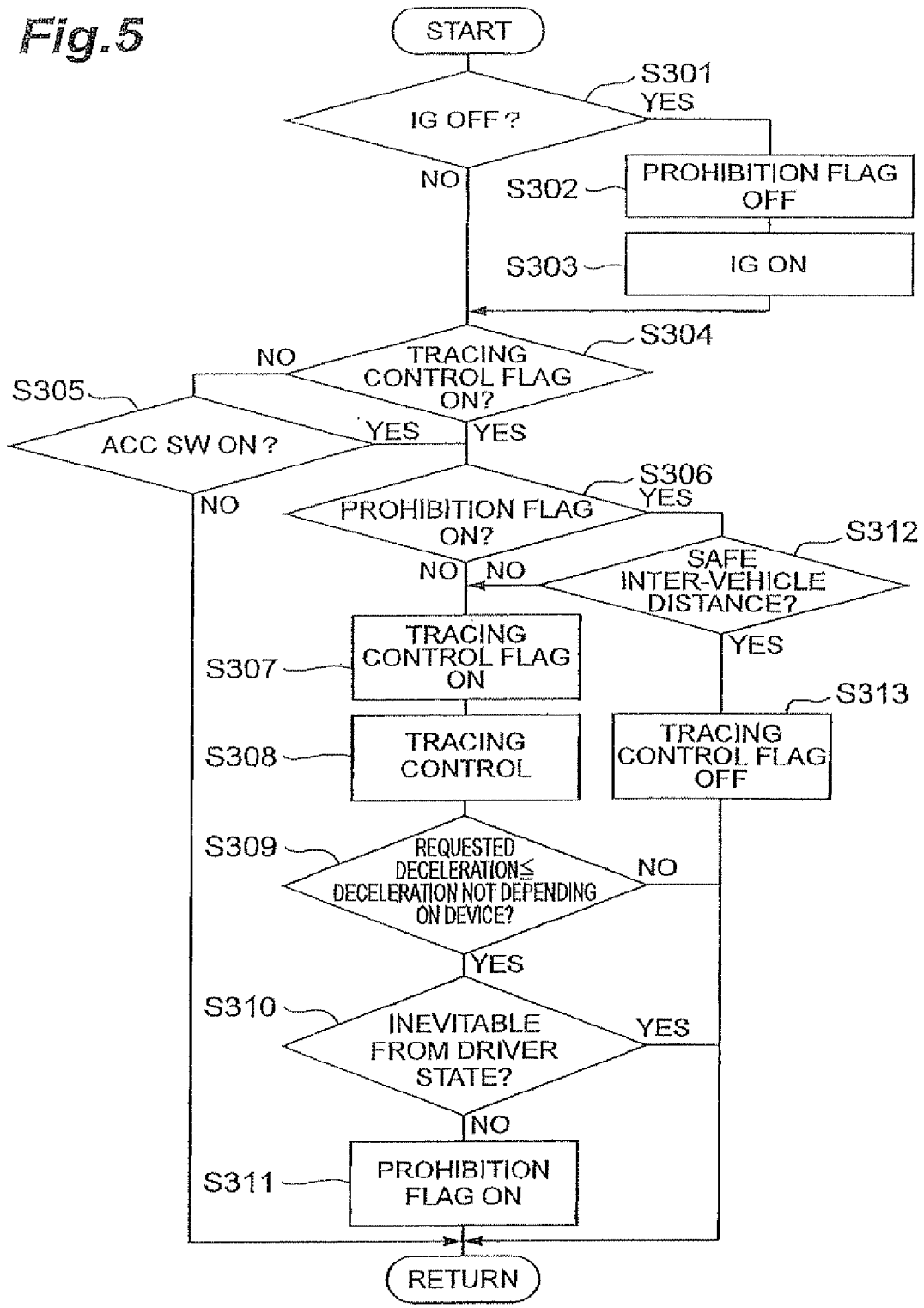
FIG. 5 is a flow chart showing an operation of an ACC system related to a third embodiment.

Hereinafter, a second embodiment of the present invention will be described. As shown in FIG. 5, the inter-vehicle control ECU 20 executes the same process S301 to S309 as the process S101 to S109 in the first embodiment described above.

In the present embodiment, in S309 where the tracing control flag is ON, even if the requested deceleration which is requested in order that the host vehicle and a preceding vehicle do not collide with each other becomes equal to or lower than the deceleration at which the driver does not depend on the device (S309), the inter-vehicle control ECU 20 does not set the prohibition flag to ON when it is determined from the driver state detected by the driver alertness and state detecting sensor 48 that a situation in which deceleration is requested is inevitable.

In this case, as an example of a driver situation in which it is determined that a situation in which deceleration is requested is inevitable, a situation may be considered in which the driver has no choice but to turn his or her face direction, line-of-sight direction, and alertness in different directions from those of the preceding vehicles because the driver attention is drawn to a vehicle approaching from the adjacent lane, a vehicle approaching from behind, a pedestrian invading the roadway from the sidewalk, a bicycle, and the like.

On the other hand, when it is not determined from the driver state detected by the driver alertness and state detecting sensor 48 that the situation of the requested deceleration is inevitable, the inter-vehicle control ECU 20 sets the prohibition flag to ON (S311). As the process after setting the prohibition flag to ON, S312 and S313 are executed similar to S111 and S112 in the first embodiment described above. Alternatively, it is also possible to execute the same process as S211 to S213 in the second embodiment described above.

In the present embodiment, the driver alertness and state detecting sensor 48 detects the state of a driver, the inter-vehicle control ECU 20 determines whether or not it is inevitable that the brake control ECU 42 will give the predetermined amount of operation or more on the basis of the driver state detected by the driver alertness and state detecting sensor 48, and prohibition of the ACC control as a restriction is not executed when it is inevitable. Therefore, it is possible to avoid a harsh situation for the driver where large deceleration is required due to an inevitable situation for the driver and the prohibition flag is set to ON as a restriction accordingly.

While the embodiments of the present invention have been described, the present invention is not limited to the above-described embodiments and various modifications may also be made.

INDUSTRIAL APPLICABILITY

The present invention can provide a drive assisting device capable of reducing the dependence of a driver on the device.

REFERENCE SIGNS LIST

10: ACC system
12: radar sensor
14: stop lamp switch
16: cruise setting switch
18: brake pedal sensor
19: accelerator pedal sensor
20: inter-vehicle control ECU
30: CAN
40: engine and AT control ECU
42: brake control ECU
44: steering sensor
46: yaw and G sensor
48: driver alertness and state detecting sensor
52: AT
54: throttle actuator
56: vehicle speed sensor
58: brake actuator

The invention claimed is:

1. A drive assisting device comprising:
a detection unit that detects a traveling state of a host vehicle;
a vehicle control unit that gives a braking force for a predetermined amount of control of the host vehicle so that the traveling state of the host vehicle detected by the detection unit becomes a predetermined state;
operation amount changing means for prohibiting the vehicle control unit from giving the braking force for the predetermined amount of control of the host vehicle after the braking force given by the vehicle control unit becomes equal to or larger than a predetermined value;
restoration means for restoring the state of operation that the braking force is prohibited by the operation amount changing means to the state before the braking force is prohibited by an operation of a driver of the host vehicle;
wherein the detection unit detects an inter-vehicle distance between the host vehicle and another vehicle;
the vehicle control unit applies braking force to the host vehicle so that the inter-vehicle distance between the host vehicle and another vehicle detected by the detection unit becomes a predetermined value;
wherein the restoration means for restoring the state of operation that the braking force is prohibited by the operation amount changing means to the state before the braking force is prohibited at anyone of the time that the power source of the host vehicle is in a stopped state, the time of operation of stopping a power source of the host vehicle and the time of an operation of starting the power source of the host vehicle.

2. The drive assisting device according to claim 1,
wherein the detection unit detects a relative relationship between the host vehicle and another vehicle,
the vehicle control unit gives braking force to the host vehicle when a possibility of collision of the host vehicle and another vehicle detected by the detection unit is equal to or higher than a predetermined threshold value, and
the operation amount changing means reduces the braking force applied to the host vehicle by the vehicle control unit when the possibility of collision of the host vehicle and another vehicle detected by the detection unit is lower than the threshold value.

3. The drive assisting device according to claim 2,
wherein the operation amount changing means reduces the braking force applied to the host vehicle by the vehicle control unit to 0 when the possibility of collision of the host vehicle and another vehicle detected by the detection unit becomes lower than the threshold value due to giving the braking force to the host vehicle by the vehicle control unit.

4. The drive assisting device according to claim 1,
wherein the restoration means for restoring the state of operation that the braking force is prohibited by the operation amount changing means to the state before the braking force is prohibited when a driver of the host vehicle performs an operation of stopping a power source.

5. A drive assisting device configured to control a braking force applied to a host vehicle that is driven by a driver, the drive assisting device comprising:

a detector configured to detect a traveling state of the host vehicle, and an inter-vehicle distance between the host vehicle and another vehicle;

a vehicle controller configured to provide the braking force for a predetermined amount of control of the host vehicle such that the traveling state of the host vehicle detected by the detector becomes a predetermined state, and the vehicle controller applies braking force to the host vehicle such that the inter-vehicle distance between the host vehicle and the other vehicle detected by the detector becomes a predetermined value;

an operation amount changing controller configured to prohibit the vehicle controller from providing the braking force for the predetermined amount of control of the host vehicle after the braking force provided by the vehicle controller becomes equal to or greater than a predetermined value; and a restoration controller configured to restore the amount of operation reduced by the operation amount changing controller to a value before reduction by an operation of the driver of the host vehicle;

wherein the restoration controller is configured to restore the state of operation that the braking force is prohibited by the operation amount changing controller to the state before the braking force is prohibited at anyone of the time that the power source of the host vehicle is in a stopped state, the time of operation of stopping a power source of the host vehicle and the time of an operation of starting the power source of the host vehicle.

6. The drive assisting device according to claim 5, wherein the detector detects a relative relationship between the host vehicle and the other vehicle, the vehicle controller provides the braking force to the host vehicle if a possibility of collision of the host vehicle and the other vehicle detected by the detector is equal to or higher than a predetermined threshold value, and the operation amount changing controller reduces the braking force applied to the host vehicle by the vehicle controller when the possibility of collision of the host vehicle and the other vehicle detected by the detector is lower than the threshold value.

7. The drive assisting device according to claim 6, wherein the operation amount changing controller reduces the braking force applied to the host vehicle by the vehicle controller to zero if the possibility of collision of the host vehicle and the other vehicle detected by the detector becomes lower than the threshold value due to the braking force received by the host vehicle as provided by the vehicle controller.

8. The drive assisting device according to claim 5, wherein the restoration controller is configured to restore the state of operation that the braking force is prohibited by the operation amount changing controller to the state before the braking force is prohibited if the driver of the host vehicle performs an operation of stopping a power source.

* * * * *